WEB TRANSPORT

Filed June 4, 1962

INVENTORS
R. DAVISON
J. SIMON
J. ESSELSTYN

BY F. L. Sullivan

ATTORNEY 3,122,295
WEB TRANSPORT

Richard H. Davison, Millis, and John G. Simon, Woburn, Mass., and James O. Esselstyn, Tulsa, Okla., assignors to Sylvania Electric Products Inc., a corporation of Delaware Filed June 4, 1962, Ser. No. 199,740
5 Claims. (Cl. 226—50)

This invention is concerned with magnetic tape transporting mechanisms and particularly with a pneumatic technique and capstan design for such transportation.

Present tape transporting mechanisms feature the following basic components: a pair of storage reels, a pair of tape-driving capstans, a tape brake, a pair of vacuum wells, and a recording head. One storage reel is arranged for feeding tape and the other for collecting it after the read or write operation, which is performed by the recording head actuated with appropriate electronics. Since the reels for storing the tape are of a relatively high mass, inertia problems are encountered when it is desired to start or stop their operation. Consequently, vacuum wells are usually provided to store the tape before it is passed from the feeding reel to the first capstan and after it has passed the second capstan on the way to the take-up reel. These vacuum wells hold a predetermined length of tape, so that a fast stop or start is buffered by the take-up of slack in the vacuum wells, thus avoiding the high inertia of the reels.

Starting, driving, and stopping operations are presently performed at the capstan by one of two methods. The first makes use of pivotably connected pinch rollers and arms which positively engage the tape against the capstan, thereby imparting the rotating motion of the capstan to the tape through friction. However, since tape is usually comprised of an oxide coating on a base material such as mylar plastic plastic and the recording is done on the oxide, it is important to prevent abuse to the coating. Whether this coating contacts the pinch roller or the capstan, the tape driving operation results in significant wear and deterioration of the oxide, thereby destroying recorded information. Moreover, with this type drive, starting time is limited by the mechanical oscillation of the pinch roller due to bounce when it is driven against the capstan.

Another driving method utilizes a vacuum at the center of the rotating capstans. This vacuum, through radial holes in the capstan, causes the tape to be drawn to the capstan, thereby imparting the motion of the capstan to the tape. Problems arise, however, in maintaining tolerances in the capstan for appropriately handling the imparted vacuum. Also, the tape-engaging force is limited because the maximum differential pressure available with atmospheric pressure on one side of the tape and vacuum on the other is 14.7 p.s.i.

Attempts have been made to provide a more effective pneumatic drive by blowing air against the tape from a manifold adjacent the capstan at the same time that vacuum is applied from within it. For example, U.S. Patent 2,852,253, issued to W. H. P. Pouliart describes such a system wherein air pressure is applied to the manifold and a vacuum is applied to the capstan to drive tape; and, in a reverse operation, vacuum is applied to the stationary manifold and pressure is applied to the capstan to disengage the tape from the capstan and hold it to the manifold in a braking operation. Another pneumatic driving and braking system is disclosed in U.S. Patent 2,866,637, issued to R. A. Pendleton. Here, the tape is driven by vacuum applied to the capstan without the aid of air pressure from a manifold and braking is accomplished by applying vacuum to a brake located proximate the reading head and between the two rotating capstans.

These pneumatic drives have proved satisfactory in that they avoid the wear and tear on the tape of the pinch roller devices and do not suffer a loss in start-up time while waiting for roller bounce to dampen. They require, however, a very considerable amount of complicated and expensive electromechanical control to operate a number of valves in the air supply system with the necessary millisecond timing required to turn pressure on, vacuum off, etc. in the proper combination to start and stop tape within the thousandths of an inch locations and at the millisecond speeds required for compatibility with modern high speed computers and other electronic data processing apparatus. Morever, the necessity for evacuating air through the capstan requires mechanically troublesome vacuum-tight rotary joints.

Accordingly, a principal object of the present invention is to provide an improved web transport system of the type useful for driving magnetic tapes. A further object is to provide a pneumatic tape drive which is less complicated in structure and more dependable in operation than those hitherto available.

These and other objects are accomplished in one illustrative embodiment of the invention which will be described as featuring a pneumatic driving system for a magnetic tape transport in which tape is driven by blowing it into contact with a constantly rotating capstan. The capstan is provided with a specialized arrangement of air ports leading from the tape-contacting surface to the outside atmosphere, and a constant braking force is applied to the tape, even during the driving cycle, so that no extra braking mechanism or control system is required to stop the tape instantaneously when the air pressure which forces it against the driving capstan is released.

These, and other features, embodiments, modifications, etc., of the invention will be readily apparent from the following description and reference to the accompanying drawings, wherein.

Figure 4:
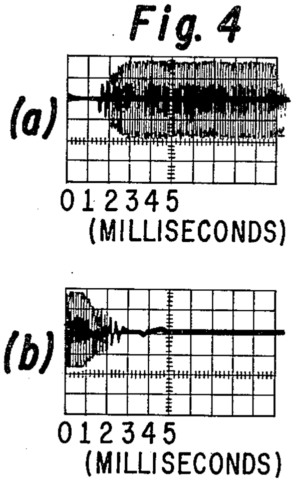

FIGS. 4*a* and 4*b* are reproductions of photographs of oscilloscope indications of tape starting and stopping times, respectively, with apparatus embodying the invention.

Figures 1, 3:
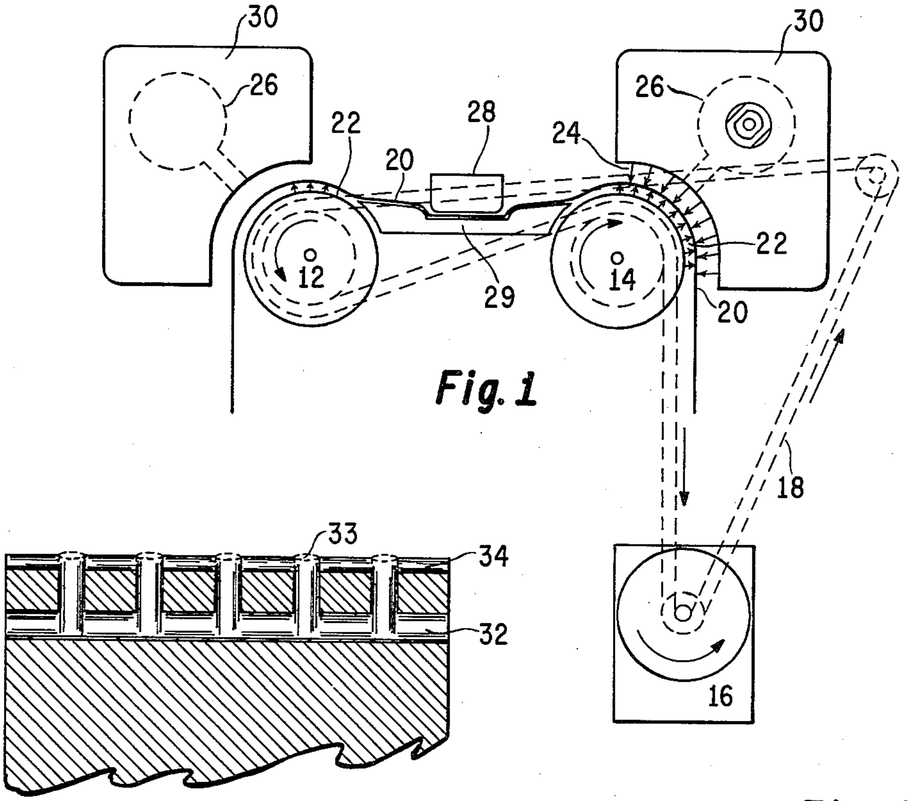
FIG. 1 is a diagrammatic representation of the capstan drive system.
FIG. 3 is a sectional view along the line 3—3 of FIG. 2.

The components of a pneumatic capstan drive embodying the invention are illustrated in FIG. 1. Two capstans 12 and 14 are shown being constantly driven, in opposite directions, by motor 16 and belt 18. The tape 20 floats upon an air bearing 22, caused by the design of the capstan, and read/record head 28 and a brake 29 are located intermediate the capstans 12 and 14. A valve 26 and manifold 30 assembly is located adjacent each capstan.

One of the two capstans 12 and 14 is designated for forward drive and the other for reverse drive. FIG. 1 shows capstan 12 as arbitrarily chosen for forward drive and capstan 14 for reverse. The capstans 12 and 14 are constantly rotating in opposite directions and when no tape drive command is in effect, the tape 20 is separated from the capstans by a self-generated air bearing support 22. When a tape drive command is received, an electropneumatic valve 26 is actuated causing air 24 under pressure to be transmitted through the appropriate manifold 30 against the tape 20. The tape is forced rapidly toward the capstan 14 surface, but is restrained normal to the capstan by air-bearing forces 22, which increase sharply as the amount of tape-to-capstan separation decreases. Tape 20 begins moving before actual contact is made with capstan 14, since its hydrodynamic bearing configuration introduces a circumferential velocity, imparted by viscous friction, to the fluid 22 in the space between the rotating 14 and stationary 20 elements. Therefore, as the tape 20 approaches the capstan 14 surface, where the circumferential velocity is greatest, viscous friction will tend to introduce a tape 20 acceleration.

Figure 2:
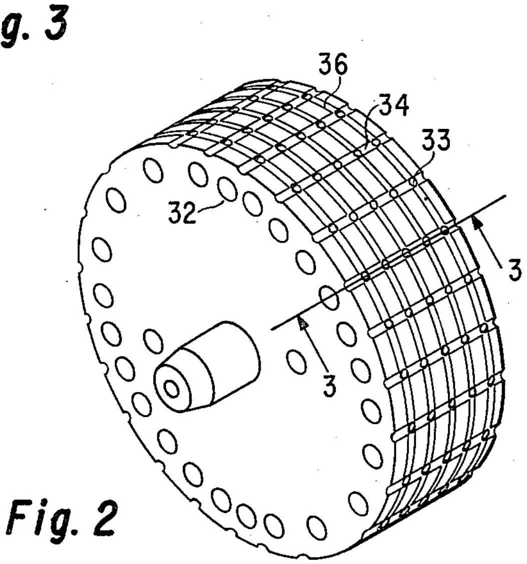
FIG. 2 is a pictorial representation of the capstan design.

FIG. 2 shows a capstan design very amenable to performance as above. Its grooved surface configuration aids the generation of a proper air bearing 22 between the capstan and tape 20 by means of lateral 34 and circumferential 36 grooves. Lateral 32 and radial 33 air-bleed holes provide air passages through the capstan to the grooves. As shown in the sectional view of FIG. 3, holes 32 pass through the capstan from one side to the other to form air conduits to and from the atmosphere, and the individual holes 33 connect the grooves 34 and 36 to this conduit. During acceleration of the tape, the holes 32 allow quick deflation of the air bearing 22 and therefore make possible a shorter time interval before friction contact between tape 20 and capstan 12 or 14 occurs. Further reduction in time is effected because the lateral and circumferential grooves 34 and 36, provide a reservoir for air 22, enabling the tape to be pressed closer and faster against the capstan while air is escaping through holes 32.

Stopping the tape 20 is accomplished by providing a Stop-Drive command to the system, thereby closing the valve 26 and returning air 24 to atmospheric pressure. However, before the tape 20 comes to a stop, atmospheric pressure must also be restored to the air bearing 22 to separate the tape from the capstan. The lateral and radial holes 32 and 33 facilitate this by admitting air to atmospheric pressure to the grooves 34 and 36 in the surface of the capstan. The lateral corrogations 34, furthermore, provide a higher coefficient of friction between the tape 20 and the capstan, thereby reducing the amount of pressure of the air 24 which is necessary before motion commences.

The electromagnetic pneumatic valve 26, used to control air in the system of FIG. 1 may be of the type disclosed in copending United States patent application Serial No. 142,415, which is also assigned to Sylvania Electric Products Inc. by the inventor, Napoleon O'Clare.

A significant feature of the tape transport under description is the functioning of the brake 29. Whereas, the brake in conventional tape transports is applied selectively so that it is energized to assist in stopping the tape and deenergized to facilitate starting, brake 29 (which may be mechanical or pneumatic) is always energized so that it exerts a constant drag on the tape while it is moving as well as when it is stopping or at rest. This does not unduly interfere with starting time, and contributes toward very smooth and fast start and stop actions which do not place serious stress or strain on the tape.

FIGS. 4*a* and 4*b*, respectively, show the speed and steady linear gradient of the start and stop actions of this apparatus. These figures are reproductions of photographs taken of digital signals read from a tape upon which a steady series of binary One's have been recorded. The grid marks on these figures are located at one millisecond intervals synchronized with start tape (FIG. 4*a*) and stop tape (FIG. 4*b*) controls at "zero" time. The uniform increase and decrease, respectively, in signal amplitude as the tape starts and stops well within a three millisecond time duration demonstrates the speed and steady linear character of the operation.

An illustrative magnetic tape transport system has been described. The invention, however, is not limited to the specifics of this description but embraces the full scope of the following claims.

What is claimed is:

1. In magnetic tape transporting apparatus of the character described, a capstan assembly comprising:

at least one capstan member with a cylindrical exterior surface about which a magnetic tape may be looped;

said capstan member having circumferential grooves, grooves normal to the end faces of said capstan member, and holes connecting the intersection of the circumferential grooves and the normal grooves to at least one of the end faces of said capstan member.

2. Web transporting apparatus comprising:

first and second web-driving capstans, each being comprised of a circular member having a plurality of first grooves around its circumferential surface and a plurality of second surface grooves each intercepting two or more of said circumferential surface grooves;

each of said capstans having a plurality of first air passages through its body portion along lines which are substantially parallel with the center axis of the capstan and a plurality of second air passages connecting said surface grooves to said first passages, whereby an air conduit system is provided to connect said surface grooves with the surrounding atmosphere;

means for constantly rotating said first capstan in one direction and said second capstan in the opposite direction;

a source of air under greater than atmospheric pressure;

first and second air exhaust manifolds proximate said first and second capstans, respectively, each capstan and manifold combination being arranged to define a web transporting passage through which the web may be pulled by an external force and wherein said web will be supported substantially free of contact with said capstan by a cushion of air generated by rotation of said capstan at a given speed; and, means for selectively directing through one or the other of said manifolds a stream of air under pressure from said source against a web within said passage thereby collapsing said supporting cushion within said selected passage and engaging said web into frictional contact with a corresponding one of said rotating capstans, whereby said web is transported in the direction of rotation of said corresponding capstan.

3. In combination with the invention according to claim 2, a brake for arresting motion of said tape, and means for keeping said brake in constant friction contact with said tape, the applied force of said contact being of the same magnitude during web transporting and web stopping.

4. Magnetic tape transporting apparatus comprising:

first and second tape-driving capstans, each being comprised of a circular member having a plurality of first grooves around its circumferential surface and a plurality of second surface grooves intercepting two or more of said circumferential surface grooves;

each of said capstans having a plurality of first air passages through its body portion along lines which are substantially parallel with the center axis of the capstan and a plurality of second air passages connecting said surface grooves to said first passages, whereby an air conduit system is provided to connect said surface grooves with the surrounding atmosphere;

means for constantly rotating said first capstan in one direction and said second capstan in the opposite direction;

a source of air under greater than atmospheric pressure;

first and second air exhaust manifolds proximate said first and second capstans, respectively, each capstan and manifold combination being arranged to define a tape transporting passage through which the tape may be pulled by an external force and wherein said tape will be supported substantially free of contact with said capstan by a cushion of air generated by rotation of said capstan at a given speed;

means for selectively directing through one or the other of said manifolds a stream of air under pressure from said source against a length of tape within said passage thereby collapsing said supporting cushion within said selected passage and engaging said tape into frictional contact with a corresponding one of said rotating capstans, whereby said tape is transported in the direction of rotation of said corresponding capstan; and, means for stopping the transport motion of said tape, said stopping means including means for disconnecting the flow of air under pressure through said manifolds and a brake arranged for holding said tape against free motion, said brake being arranged for holding said tape with the same force when it is being transported as when it is being stopped.

5. In a tape transporting system wherein the tape is transported by directing air under pneumatic pressure onto the tape, thereby forcing it against a rotating capstan to impart the motion of the capstan to the tape, a right-circular cylindrical capstan having:

a plurality of circumferential surface grooves;

a plurality of surface grooves normal to the end faces of the capstan; and a plurality of holes connecting said circumferential and normal grooves to the end faces of said capstan.

References Cited in the file of this patent

UNITED STATES PATENTS

| | | |
|---|---|---|
| 2,778,634 | Games et al. | Jan. 22, 1957 |
| 2,852,253 | Pouliart et al. | Sept. 16, 1958 |
| 2,954,911 | Baumeister et al. | Oct. 4, 1960 |
| 2,987,233 | Selsted | June 6, 1961 |

FOREIGN PATENTS

| | | |
|---|---|---|
| 677,882 | Germany | June 8, 1939 |